United States Patent [19]

Honeycutt et al.

[11] Patent Number: 4,614,913
[45] Date of Patent: Sep. 30, 1986

[54] INHERENTLY BORESIGHTED LASER WEAPON ALIGNMENT SUBSYSTEM

[75] Inventors: Thomas E. Honeycutt, Sommerville; Thomas G. Roberts, Huntsville, both of Ala.

[73] Assignee: The United States of America as represented by the Secretary of the Army, Washington, D.C.

[21] Appl. No.: 605,544

[22] Filed: Apr. 30, 1984

[51] Int. Cl.⁴ .................... H01S 3/00; G01B 11/26
[52] U.S. Cl. ................................. 330/4.3; 356/152
[58] Field of Search ..................... 330/4.3; 356/152

[56] References Cited

U.S. PATENT DOCUMENTS

| | | | |
|---|---|---|---|
| 3,622,907 | 11/1971 | Tomlinson et al. | 330/4.3 |
| 3,753,152 | 8/1973 | Pettipiece | 330/4.3 |
| 3,946,233 | 3/1976 | Erben et al. | 356/152 |
| 4,102,572 | 7/1978 | O'Meara | 356/152 |
| 4,146,329 | 3/1979 | King et al. | 356/152 |
| 4,168,908 | 9/1979 | Cubalchini | 356/152 |
| 4,326,800 | 4/1982 | Fitts | 356/152 |
| 4,515,472 | 5/1985 | Welch | 356/152 |

Primary Examiner—S. C. Buczinski
Attorney, Agent, or Firm—Anthony T. Lane; Robert P. Gibson; Robert C. Sims

[57] ABSTRACT

A laser weapon which has no boresighting problems in that only one laser is used to perform all the functions of search, track, and negation. The laser weapon is made to operate in both a low power cw mode and a high energy pulsed mode about the boresight. This is accomplished here by the application of a material which can be rapidly switched from a transmissive to a reflective state so as to be able to utilize the same laser for search, travel, and negation; thus eliminating the need for boresight and requiring only alignment.

9 Claims, 4 Drawing Figures

INHERENTLY BORESIGHTED LASER WEAPON ALIGNMENT SUBSYSTEM

DEDICATORY CLAUSE

The invention described herein may be manufactured, used, and licensed by or for the Government for governmental purposes without the payment to us of any royalties thereon.

BACKGROUND OF THE INVENTION

Typically a laser weapon needs to perform three primary functions. It must search for, detect, and identify targets. This is usually called the search and acquire mode which utilizes a wide field-of-view. After the target is acquired it is handed over to a tracking system that utilizes a narrow field-of-view. The target is tracked and an aim point is designated. At this time the negation laser can be fired to destroy the target. Then, the system switches back to the search and acquire mode to repeat the sequence of these three functions. To perform these functions requires two or more lasers. The search and track lasers (which may be the same laser) are low power cw lasers and the negation lasers is a high energy pulsed laser. Thus it is necessary for the track laser, which designates the aimpoint on the target, and the high energy negation laser to be aimed at the same point. This is generally accomplished by having these two lasers share the same exit aperture which means that they must be boresighted.

Obtaining and maintaining boresight is a difficult task and complicated systems have been designed for this purpose. As an example, consider FIG. 1 which illustrates such a system. Here the output search and track laser 1 is reflected off a local loop tilt mirror 2. Part of this beam is now reflected by beam splitter 3. This part of the beam is then chopped by chopper 4 and is reflected back on itself by the corner cube 5. After reflection it passes through the beam splitter 3 and is focused by the lens 6 onto the beam transport alignment sensor 7. The remaining portion of the beam is propagated to the beam splitter 8. Another part of the beam is reflected off this beam splitter 8 and is propagated through the hole in the boresight mirror 9 to the grating 10. The zeroth order reflection off the grating 10 is propagated to mirror 11 where it is reflected to the beam transport tilt mirror 12. The beam is then transported to the gimbal mirrors (not shown) where it is reflected to output telescope secondary mirror 21 and a small part of the energy is reflected from the secondary back towards the beam transport tilt mirror 12 where it is made to retrace itself by adjusting the tilt mirrors 12 and laser 1 until both the transmitted beam and the reflected beam are imaged to the same spot on the sensor 7. At this point the search and track laser has been aligned. The first order reflection of the search and track laser beam off the grating 10 is reflected by mirror 13 to the diagnostic tilt mirror 14 and after reflection from this mirror it is imaged by the lens system 15 on the boresight sensor 16. The diagnostic tilt mirror is used to position this beam on the sensor 16. The portion of the search and track laser beam that passes through the beam splitter 8 is reflected by mirror 17 through the chopper 18 to the tilt mirror 19. This beam is then sent through the resonator 20 of the negation laser. When the beam leaves the resonator of the negation laser it has a large diameter and it is hollow. This beam is reflected from the boresight mirror 9 to the grating 10. The boresight mirror 9 is now tilted until the first order reflection from the grating 10 is imaged by mirrors 13 and 14 and the optical system 15 onto the same spot on the boresight sensor 16 of that where the search and track laser's first order reflection is imaged.

Once this boresight alignment has been obtained, control loops on all the tilt mirrors are required in an attempt to maintain this alignment.

SUMMARY OF THE INVENTION

An object of this disclosure is to produce a system in which the search and track laser and the negation laser are inherently boresighted which greatly reduces the complexity and cost of the beam transport system and its control requirements.

Another object is to produce a laser system that runs cw at relatively low power and which may be pulsed in a manner that produces high energy pulses. Normally, low power cw lasers cannot be pulsed in this manner and high energy pulsed lasers cannot be made to run cw because these two modes of operation have mutually exclusive requirements on the laser gain medium.

DESCRIPTION OF THE BEST MODE AND PREFERRED EMBODIMENT

Figure 4:
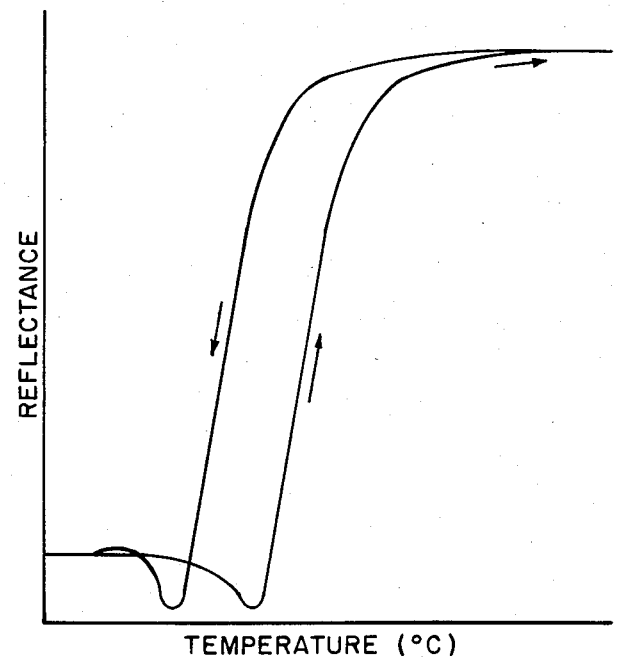
FIG. 4 is a schematic illustration of the reflectance of the $VO_2$ window/mirror as a function of temperature.
Figure 2:
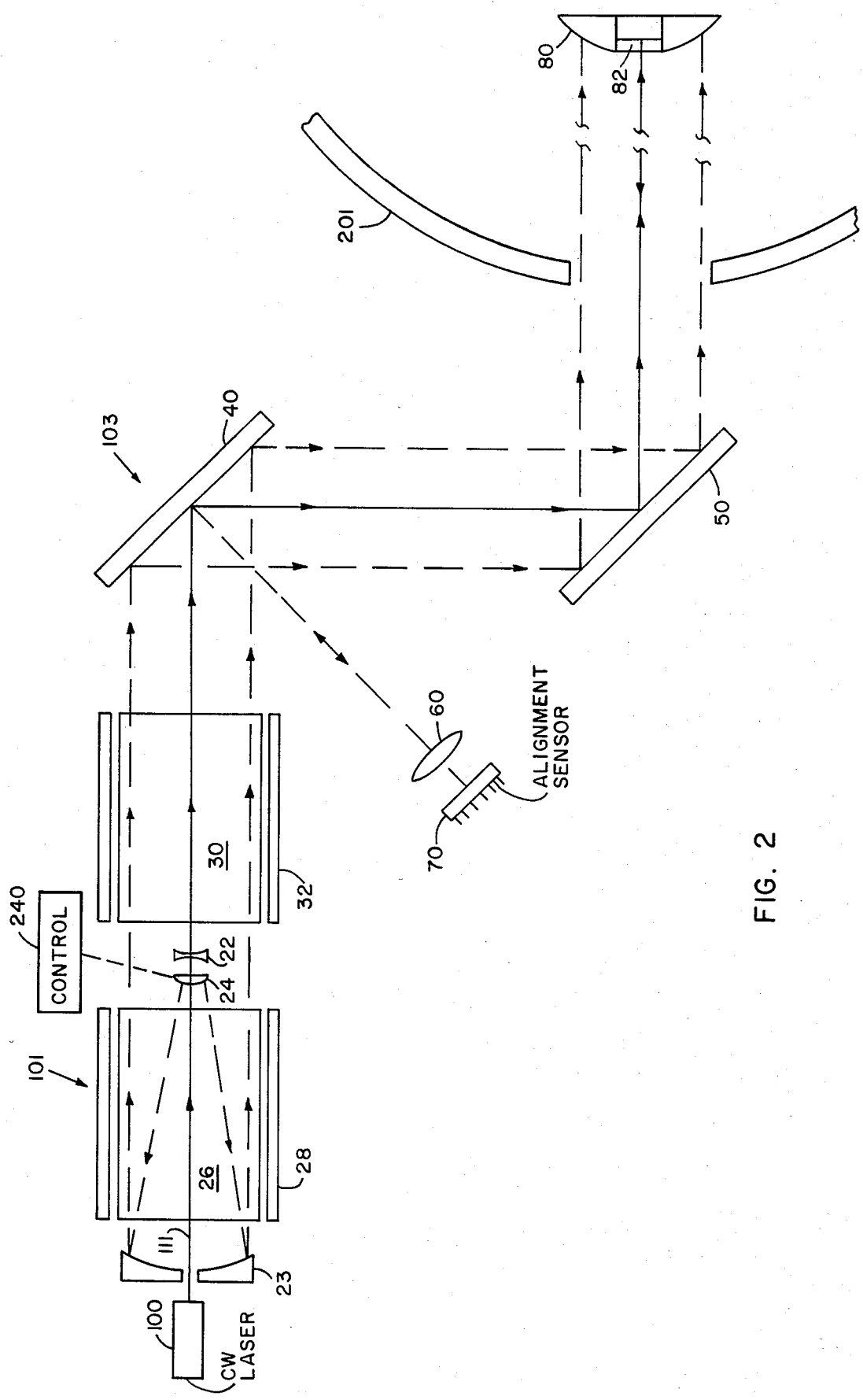
FIG. 2 is a schematic illustration of the alignment sybsystem for the inherently boresighted laser weapon.

Referring to the drawings in FIG. 2, the inherently boresighted laser weapon alignment subsystem consist of the following components: A low power cw search and track laser 100, a high energy pulsed laser 101, power amplifier 102, and a beam transport system 103 with its alignment sensors and control loops. The high energy pulsed laser is made up of a resonator consisting of mirrors 23 and 24, an active medium 26 and the pulsed pump sources 28. The mirror 24 is the key element which allows this system to work since it is a window for the low power track and search laser and a mirror for the high energy pulsed laser even though these two lasers are operating at the same wavelength. This mirror/window is made of a film of $VO_2$ on a faceplate of a material which transmits radiation at the wavelength of interest—which in this case is that of the $CO_2$ laser 101 and is in the neighborhood of 10.6 μm. The faceplate may be made of germanium, intran, or coated salts, or any other material which transmits radiation in the 10.6 μm region. The window/mirror 14 is a window when its temperature is below 67° C. and a mirror when its temperature is above 67° C. That is to say, this component is a variable reflectance mirror (VRM) and the variation of reflectance is achieved by using $VO_2$ film. $VO_2$ undergoes a first order phase transition at 67° C. Below 67° C., the material is metallic and highly reflecting in the IR region. A schematic illustration of this property is shown in FIG. 4 (see A. S. Barker, Jr., H. W. Verleur, and H. J. Guggenheim, "Infrared Optical Properties of Vanadium Dioxide Above and Below the Transition Temperature," Phys.

Rev. Ltrs, Vol. 17, No. 26, page 1286, Dec. 1966, and for an application of this material see Jay S. Chivian, W. E. Case, and D. H. Rester, "A 10.6 μm Scan Laser With Programmable VO₂ Mirror," IEEE J. of Quant. Elec., Vol. QE-15, No. 12, Dec. 1979.) This material can be switched from transmission to reflection in times of microseconds or less, which is much faster than required for the application disclosed here. The energy to heat the $VO_2$ can come from the radiation build up in the active medium 26 when it is pulsed. In this case, the $VO_2$ film acts as a "Q"-switch for the high energy pulsed laser. The mirror 24 is cooled (not shown) by a fluid which is carried by a spider that holds the cavity feedback mirror 24 and the lens 22. The mirror 24 could also be switched from transmission to reflection and back again by fluids carried by the spiders. In this case the mirror will be switched before the laser is pulsed and will act as an injection locking source. The spider and the fluid system can take the shape of any of the known devices and are shown in block form as control 240 in FIG. 2.

When the component mirror 24 is below 67° C. it acts as a window which passes the low power search and track laser beam; but since this element is shaped so as to be a feedback mirror for the resonator of the high energy pulsed laser 101, it will tend to focus the search and track laser beam. Therefore lens 22 is used to recollimate the search and track laser beam. This beam now passes through the active medium 30 of the high power amplifier 102. The pulsed pump sources for the high power amplifier are indicated at 32. The active media of the high energy oscillator and the high power amplifier are transparent to the low power cw search and track laser beam 111 when they are not being pumped by the sources 28 and 32. After the search and track laser beam leaves the power amplifier it propagates to the high power grating 40 where the zeroth order reflection is directed toward the beam transport system tilt mirror 50. The high power grating 40 is now positioned (tilted) until the first order reflection (which is imaged by the optical system 60) is centered on the beam transport alignment sensor 70. The reflections from mirror 50 may be blocked during the initial alignment of grating 40. The beam transport system tilt mirror 50 is now positioned (tilted) until a portion of the cw laser beam 111 is reflected back toward the beam transport system tilt mirror 50 through a hole in primary reflector 201 by the partically reflecting window 82 that is located in the secondary mirror 80 of the telescope for the high energy pulsed laser. The reflected portion of the search and track laser beam is now reflected back by mirror 50 toward the high power grating 40 where its first order reflection is also imaged by the optical system 60 onto alignment sensor 70. The beam transport system tilt mirror 50 is now used to cause this image to coincide with the first image. At this time the system has been aligned and control loops (not shown) are used with 40 and 50 to keep these two images coincident and to keep the system in alignment. Any of the well known servo control systems can be used to maintain alignment.

When control is switched to heat up the $VO_2$ film, element 24 becomes reflective. Now the output of pump source 100 is not transmitted by 24 but is reflected by it so that the output of CW laser 100 becomes an injection locking beam for the high energy oscillator 101. Now when the pump sources 28 and 32 are later energized, the oscillator 101 lases and its output is amplified by the high power amplifier 102. The output of the high power amplifier is now inherently boresighted with the search and track laser beam, since they are really the same beam as seen at different times. Thus, there is no need for a complicated system to obtain and maintain a boresight for two different laser beams. The pulsed output of amplifier 102 is, for the most part, reflected off of mirror 70 onto the primary reflector 201 of the telescope and then into space towards the target.

When the laser weapon is being operated, the search and track laser beam 111 after it passes through the partically reflecting window 82 is used to perform the search and track function in a manner well known in the art. After a target has been acquired and the aimpoint has been designated a signal is sent to the excitation sources 28 and 32. These sources excite the gain media 26 and 30 and cause it to become active in a manner well known in the art. A target detector, not shown, will trigger control 240 and pump sources 28 and 32 for the firing of a killer-power laser pulse. The component 24 is switched from the transmitting state to the reflecting state by control 240. This causes a mode to form in the resonator cavity of the high energy oscillator, and a pulse of energy is passed from the oscillator 101 through the high power amplifier 102 where its energy is increased and then on through the beam transport system 103 to the telescope secondary mirror and from there it is focused by the primary mirror 201 onto the target aimpoint where the desired damage effect is produced. The component 24 is then switched back to the transmitting state by control 240. The search and track laser beam 111 is again transmitted through the window 82 and the search and track functions are repeated until a new target has been acquired and a new aimpoint has been designated.

Figure 1:
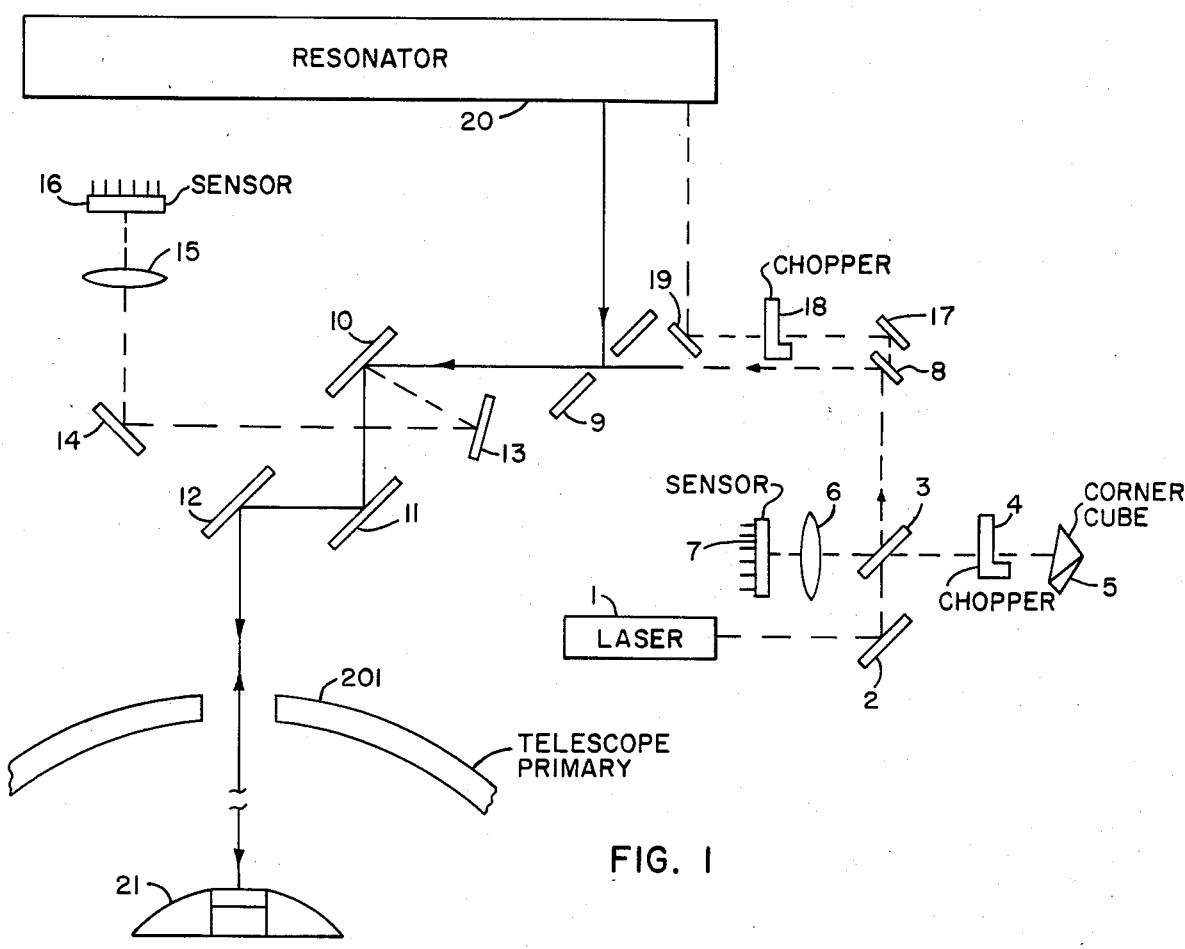
FIG. 1 is a schematic illustration of a complex alignment subsystem which accomplishes boresighting.
Figure 3:
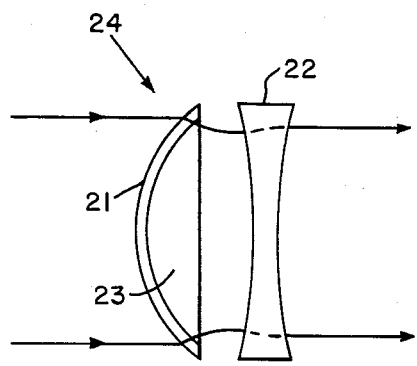
FIG. 3 is a schematic illustration of the $VO_2$ coated mirror/window which switches the laser from a cw mode to a pulsed mode and back to cw, etc.

FIG. 3 is an enlarged schematic illustration of the $VO_2$ coated mirror/window 24. The component 24 is made of a $VO_2$ coating 21 and a transmitting baseplate 23. The lens 24 which is used to recollimate the search and track laser beam is also shown. The thickness of the coating 21 is determined by the output power required from the oscillator and on the switching time required by the weapon system, but in any case it is thin. FIG. 4 shows the reflectance as temperature response of $VO_2$. Two or more high power amplifiers may be used so that the requirements placed on the component 24 are not impractical. Also it may in some cases be desired for the beam from the oscillator to be folded through the high power amplifier so that one gain medium acts as more than one amplifier stage, but only one pump source is required.

The lasers used in this embodiment are cw and pulsed $CO_2$ sources. The cw laser whose output energy is at a wavelength longer than 2 m may be used. See the above cited reference by A. S. Baker, et al. The pump sources may be e-beam sustained discharges, μv initially self-sustained, or x-ray initiated self-sustained discharges.

We claim:
1. An inherently boresighted laser system comprising a lower powered laser means aligned along a desired optical path; a higher powered laser means aligned along the same optical path; first and second reflecting means aligned with said higher powered laser means; said first reflecting means having an orifice therein whereby a beam from said lower powered laser means can pass therethrough; and said second reflecting means being switchable such that in a first state the beam from the lower powered laser will pass therethrough and in a second state said reflecting means will reflect any laser beam back toward said first reflecting means.

2. A system as set forth in claim 1 wherein said second reflecting means is a window having a film of $VO_2$ deposited thereon.

3. A system as set forth in claim 2 wherein said second reflection means is switchable in accordance to temperature; control means connected to said second reflecting means so as to control which state said second reflecting means is in; and said control means is connected to said second reflecting means so as to control the temperature thereof.

4. A system as set forth in claim 1 further comprising a beam transport system; said transport system comprising a grating; a third reflector; a telescope system having a secondary mirror therein which will partially reflect back toward the transport system a portion of any laser beam striking it; said grating being aligned with said third reflector and said telescope such that a zeroth order of reflection from said grating will be directed towards said third reflector and then towards said telescope; and an alignment sensor located relative to said grating so as to receive a first order reflection from said grating so as to give information as to the alignment of said grating and said third reflector means.

5. A system as set forth in claim 1 further comprising an amplifier aligned along said optical path for amplifying the laser output of the said higher powered laser.

6. A system as set forth in claim 5 further comprising a beam transport system; said transport system comprising a grating; a third reflector; a telescope system having a secondary mirror therein which will reflect back toward the transport system a portion of any laser beam striking it; said grating being aligned with said third reflector and said telescope such that a zeroth order of reflection from said grating will be directed towards said third reflector and then towards said telescope; and an alignment sensor located relative to said grating so as to receive a first order reflection from said grating so as to give information as to the alignment of said grating and said third reflector means.

7. A system as set forth in claim 6 wherein said lower powered laser is a continuous wave laser; and said higher powered laser means and said laser means are pulse lasers.

8. A system as set forth in claim 7 wherein said second reflecting means comprises a window having a film of $VO_2$ material deposited thereon.

9. A system as set forth in claim 1 wherein said second reflecting means acts as a Q-switch for the higher powered laser and is switched to said second state in response to operation of said higher powered laser.

* * * * *